US010252758B2

(12) United States Patent
Lickton

(10) Patent No.: US 10,252,758 B2
(45) Date of Patent: Apr. 9, 2019

(54) BICYCLE MOUNT APPARATUS

(71) Applicant: Robert J. Lickton, Elmwood Park, IL (US)

(72) Inventor: Robert J. Lickton, Elmwood Park, IL (US)

(*) Notice: Subject to any disclaimer, the term of this patent is extended or adjusted under 35 U.S.C. 154(b) by 2 days.

(21) Appl. No.: 15/497,304

(22) Filed: Apr. 26, 2017

(65) Prior Publication Data
US 2018/0154967 A1 Jun. 7, 2018

Related U.S. Application Data

(60) Provisional application No. 62/429,012, filed on Dec. 1, 2016.

(51) Int. Cl.
*B62H 3/00* (2006.01)
*B62H 3/10* (2006.01)

(52) U.S. Cl.
CPC ............... *B62H 3/00* (2013.01); *B62H 3/10* (2013.01)

(58) Field of Classification Search
CPC ...... B62H 3/10; B62H 2700/005; B62H 3/00; B65D 25/10; B65D 85/68; B65D 2585/6862
See application file for complete search history.

(56) References Cited

U.S. PATENT DOCUMENTS

| | | | | | |
|---|---|---|---|---|---|
| 1,602,383 | A | * | 10/1926 | Andersson | A47B 87/02 248/551 |
| 3,828,993 | A | * | 8/1974 | Carter | B60R 9/048 211/22 |
| 4,792,039 | A | * | 12/1988 | Dayton | A45C 5/14 206/304 |
| 4,892,190 | A | * | 1/1990 | Delgado | B62J 99/00 206/304 |
| 4,991,715 | A | * | 2/1991 | Williams | A45C 5/14 206/335 |
| 5,669,497 | A | * | 9/1997 | Evans | B65D 85/68 206/335 |
| 6,834,786 | B2 | * | 12/2004 | Hansen | B60P 3/122 211/20 |
| 7,077,374 | B1 | * | 7/2006 | Johnson | B65D 85/68 206/335 |
| 9,821,948 | B2 | * | 11/2017 | Noer | B65D 85/68 |
| 2017/0066588 | A1 | * | 3/2017 | Schreiber | F16B 2/08 |

* cited by examiner

*Primary Examiner* — Ko H Chan
(74) *Attorney, Agent, or Firm* — Nixon Peabody LLP

(57) ABSTRACT

Aspects of the present disclosure include a bicycle mount apparatus for securing a bicycle within a container, such as a shipping container. The apparatus includes a base plate having at least one aperture and a reinforcement plate having at least one mounting pin. Each mounting pin is configured to be inserted through a side of the container and an aperture. The side of the container is sandwiched between the base plate and the reinforcement plate. The apparatus also includes a bicycle fork extension extending up from the base plate and configured to couple to a bicycle fork of the bicycle. In some aspects, the apparatus also includes a bicycle fork assembly configured to couple to the bicycle fork extension. The bicycle fork assembly includes a plurality of bicycle fork adapters. Each bicycle fork adapter is configured to couple to the bicycle fork of the bicycle.

18 Claims, 12 Drawing Sheets

BICYCLE MOUNT APPARATUS

CROSS REFERENCE TO RELATED APPLICATIONS

This application is a non-provisional claiming priority to U.S. Provisional Patent Application No. 62/429,012 filed on Dec. 1, 2016, entitled "Bicycle Mount Apparatus".

TECHNICAL FIELD

The present disclosure relates generally to containers and, more particularly, to an apparatus for mounting a wheeled vehicle, such as a bicycle, within a container.

BACKGROUND

It is often desirable that an object being shipped be fixed to the container so that the object is not loose inside the container in order to prevent damage to the object. Such objects can include bicycles. For shipping bicycles, it is often more convenient to ship the bicycle with the wheels detached from the frame. However, it can be difficult to secure the frame to the container. For example, a conventional mount used to connect the frame to the container can become loose relative to the container or detach from the container entirely.

An added difficulty to overcome for shipping bicycles is the variation in how wheels attach to bicycle frames. Given the variation in bicycles frames, a conventional mount with a single type of connection to a bicycle fork does not provide flexibility in connecting different types of frames to containers.

Accordingly, the present disclosure is directed to a bicycle mount apparatus for connecting a bicycle frame to container, with the bicycle mount apparatus being able to accommodate different types of bicycle frames.

SUMMARY

In accord with aspects of the present disclosure, a bicycle mount apparatus for securing at least one bicycle within a container is disclosed. The bicycle mount apparatus includes a base plate having at least one aperture and a bicycle fork extension extending up from the base plate and configured to couple to at least one bicycle fork of the at least one bicycle. The apparatus also includes a reinforcement plate having at least one mounting pin. Each one of the at least one mounting pin is configured to be inserted through a side of the container and one of the at least one aperture when the side of the container is located between the base plate and the reinforcement plate.

In accord with additional aspects of the present disclosure, a bicycle mount apparatus for securing at least one bicycle within a container is disclosed. The bicycle mount apparatus includes a base plate having at least one aperture and a reinforcement plate having at least one mounting pin. Each one of the at least one mounting pin is configured to be inserted through a side of the container and one of the at least one aperture when a side of the container is located between the base plate and the reinforcement plate. The apparatus also including a bicycle fork assembly configured to couple to the base plate. The bicycle fork assembly includes a first bicycle fork adapter and a second bicycle fork adapter. Each of the first bicycle fork adapter and the second bicycle fork adapter is configured to couple to at least one bicycle fork of the at least one bicycle via a quick-release bicycle fork mechanism.

In accord with yet additional aspects of the present disclosure, a bicycle mount apparatus for securing at least one bicycle within a container is disclosed. The bicycle mount apparatus includes a base plate having at least one aperture and a reinforcement plate having at least one mounting pin. Each one of the at least one mounting pin is configured to be inserted through a side of the container and one of the at least one aperture when the side of the container is located between the base plate and the reinforcement plate. The apparatus further includes a bicycle fork extension extending up from the base plate and configured to couple to at least one bicycle fork of the at least one bicycle. The apparatus further includes a bicycle fork assembly configured to couple to the bicycle fork extension. The bicycle fork assembly includes a first bicycle fork adapter and a second bicycle fork adapter. Each of the first bicycle fork adapter and the second bicycle fork adapter being configured to couple to at least one bicycle fork of the at least one bicycle.

The above summary is not intended to represent every embodiment or every aspect of the present disclosure. Rather, the foregoing summary merely provides an exemplification of some of the novel aspects and features set forth herein. The above features and advantages, and other features and advantages of the present disclosure, which are considered to be inventive singly or in any combination, will be readily apparent from the accompanying drawings and the appended claim.

DETAILED DESCRIPTION

Figure 1A:
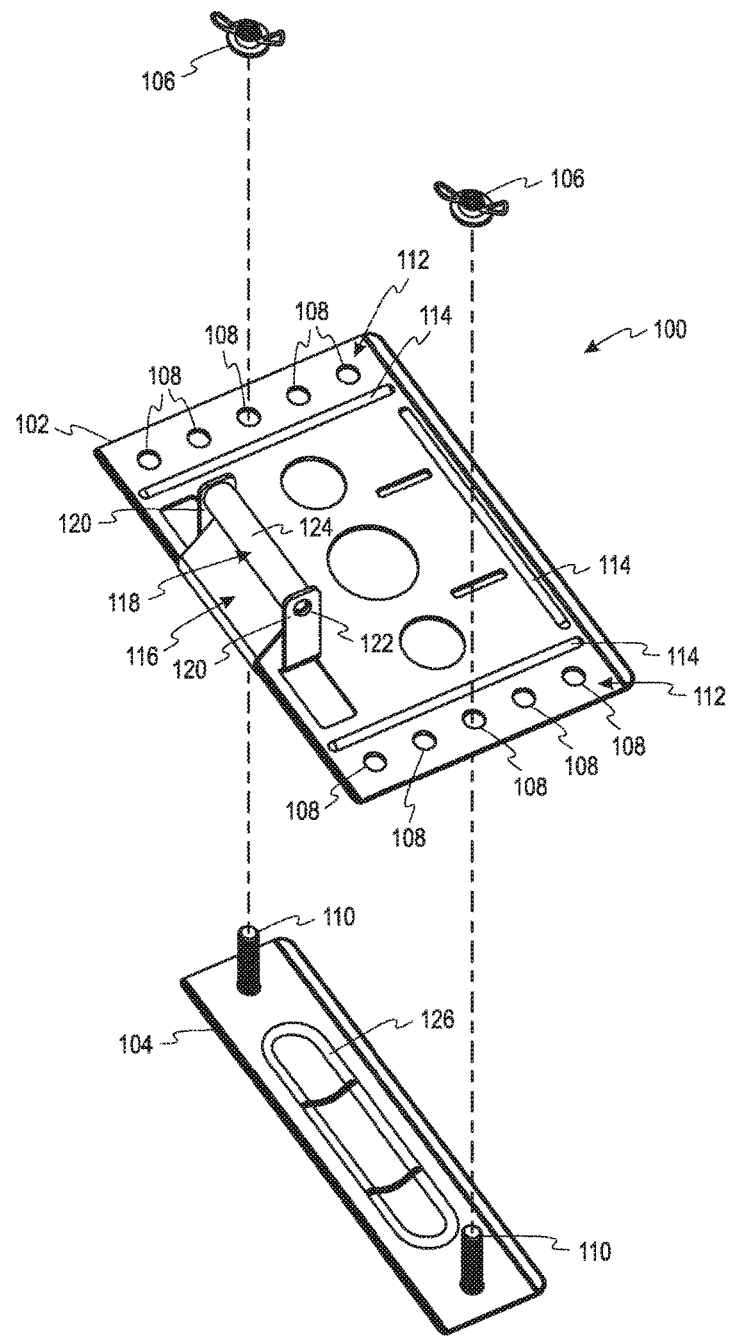
FIG. 1A is an exploded view of a bicycle mount apparatus, according to aspects of the present disclosure.

The bicycle mount apparatus of the present disclosure provides a way to couple a bicycle frame to a container for shipping the bicycle frame. In some aspects, the bicycle mount apparatus includes components inside and outside of the container to securely couple the bicycle mount apparatus to the container, such as to a side of the container.

In additional aspects, the bicycle mount apparatus can accommodate different types of bicycle frames. Such different types of bicycle frames include differences in, for example, how the front wheel of the bicycle connects to the bicycle frame, particularly the front bicycle fork of the bicycle frame. For example, for some bicycle frames, a wheel connects to the front bicycle fork by the wheel including pegs (e.g., threaded pegs) that abut against crescent-shaped open ends of the front bicycle fork. Fasteners then secure the wheel to the front bicycle fork by abutting against the crescent-shaped open ends of the front bicycle fork and the pegs of the wheel. For alternative bicycle frames, a wheel connects to the front bicycle fork by the bicycle including a quick-release bicycle fork mechanism that includes a rod that extends through apertures at the ends of the front bicycle fork and through a hollow axel in the front wheel. The quick-release bicycle fork mechanism then clamps together to secure the wheel between the front bicycle fork.

According to some aspects, the bicycle mount apparatus generally includes a base plate and a reinforcement plate. The base plate is placed within the container, and the reinforcement plate is placed outside of the container. The base plate and the reinforcement plate couple to each other through the side of a container to secure the base plate and the reinforcement plate to the container, as well as to each other.

In some aspects, the bicycle mount apparatus includes a bicycle fork extension that is integral with, or coupled to, the base plate. The bicycle fork extension is configured couple to a bicycle fork, such as a front bicycle fork, of a bicycle frame to secure the bicycle frame to the bicycle mount apparatus. The bicycle fork extension can include a bicycle fork mount portion configured to couple to a bicycle fork. By way of example, each side of the bicycle fork can be arranged on opposite sides of the bicycle fork mount portion, and one or more fasteners can be used to secure the bicycle fork to the bicycle fork mount portion.

The reinforcement plate can couple to the base plate according to various mechanical configurations. In some aspects, the reinforcement plate includes one or more pins that extend from the reinforcement plate, through the container, and into and/or through the base plate. A fastener can then be secured to each of the pins used to secure the base plate to the reinforcement plate, with the side of the container therebetween.

In some aspects, the bicycle mount apparatus can include a bicycle fork assembly. The bicycle fork assembly can directly couple to the bicycle fork extension. Alternatively, the bicycle fork assembly can directly couple to the base plate. The bicycle fork assembly can include multiple bicycle fork adapters. The multiple bicycle fork adapters allow different types of bicycles to couple to the bicycle mount apparatus, such as different types of bicycles than the bicycles that couple to the bicycle fork mount portion described above. Additionally, or alternatively, the multiple bicycle fork adapters allow the bicycle mount apparatus to secure multiple bicycles to the container simultaneously. Accordingly, the addition of the bicycle fork assembly provides for greater versatility and flexibility in securing one or more bicycles to a container using a single bicycle mount apparatus.

Figure 1B:
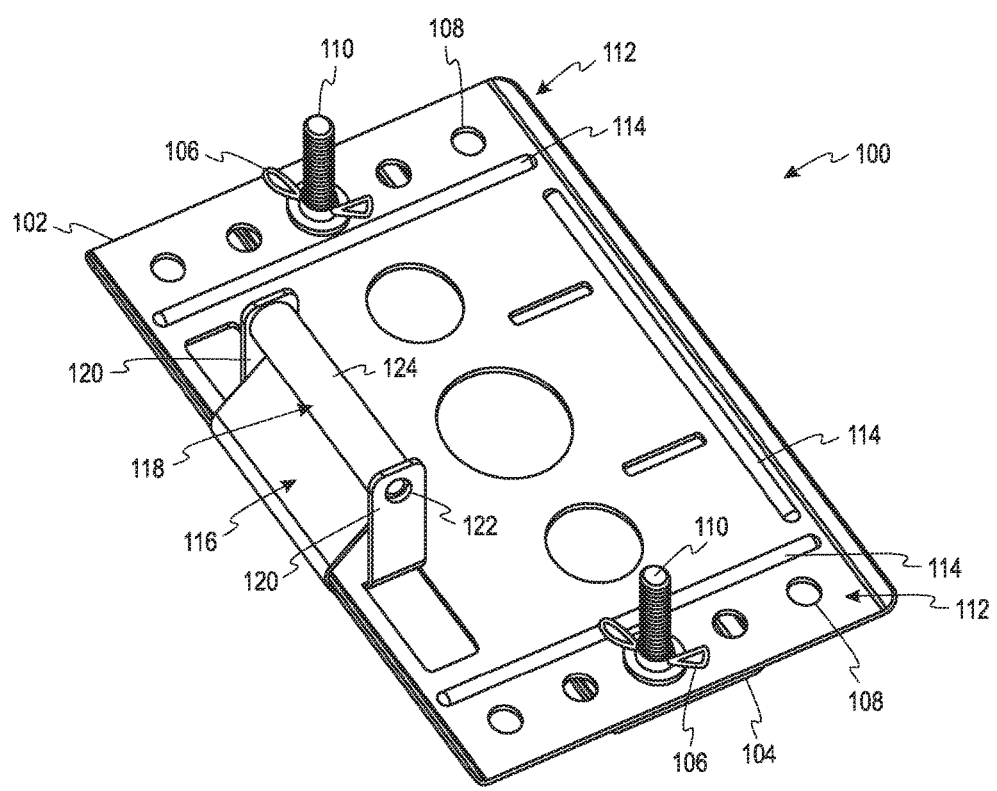
FIG. 1B shows a perspective view of the bicycle mount apparatus of FIG. 1A, according to aspects of the present disclosure.
Figure 1C:
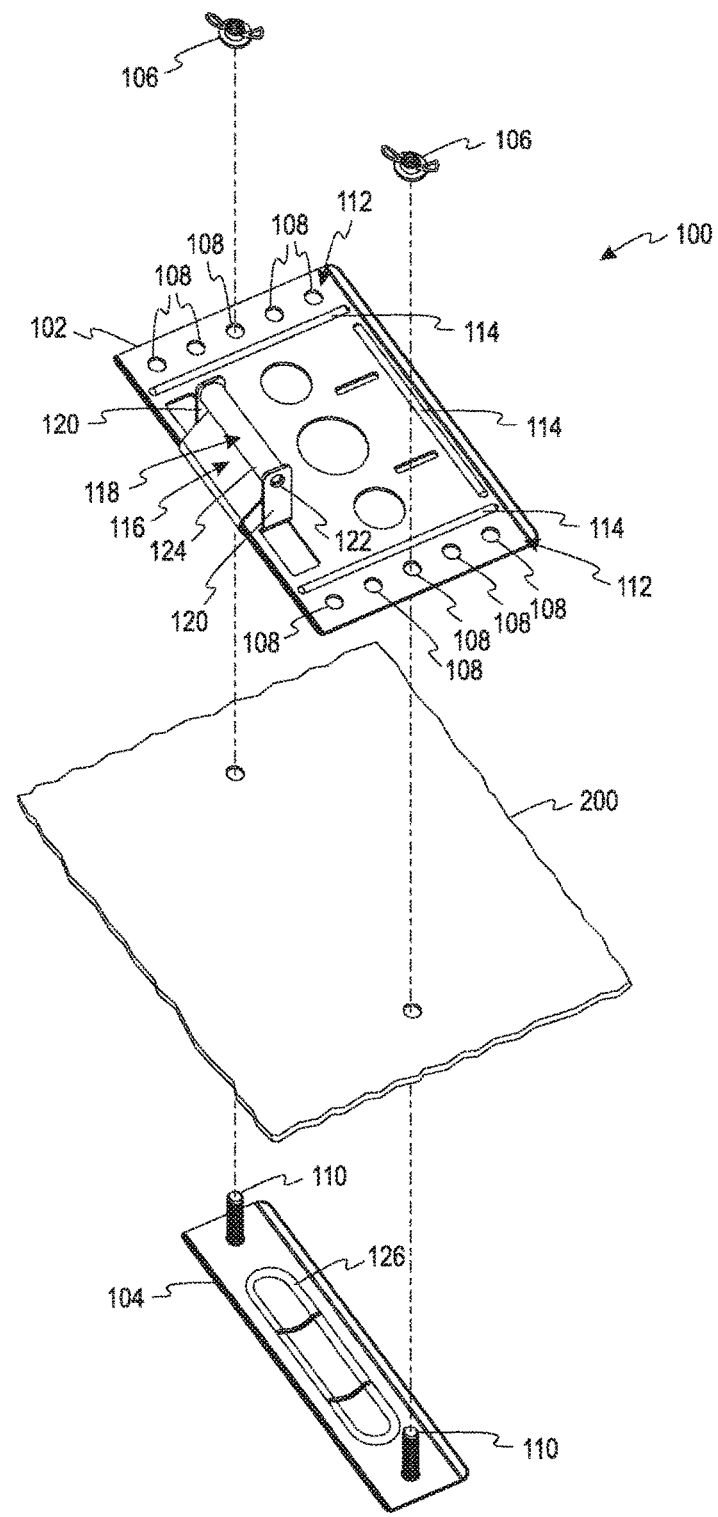
FIG. 1C shows an exploded view of the bicycle mount apparatus of FIG. 1A coupled to a side of a container, according to aspects of the present disclosure.
Figure 1D:
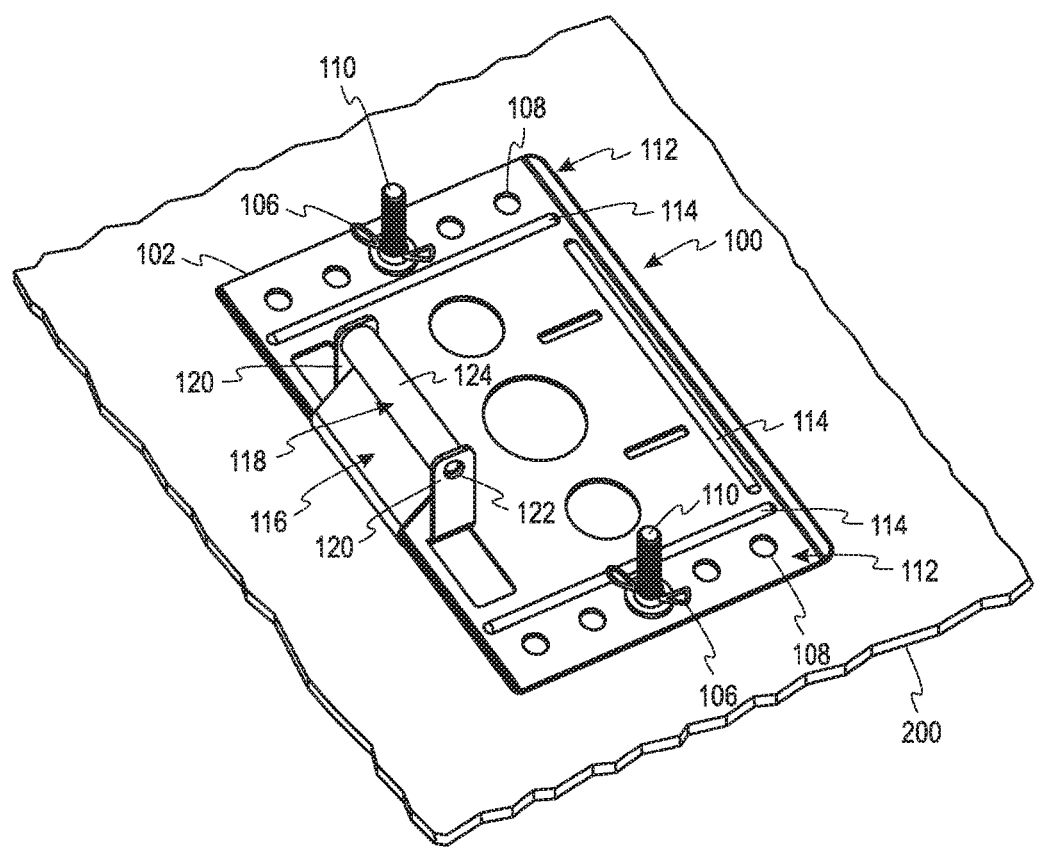
FIG. 1D shows a perspective view of the bicycle mount apparatus of FIG. 1A coupled to the side of the container, according to aspects of the present disclosure.

Referring to FIGS. 1A-1D, FIG. 1A shows an exploded view of a bicycle mount apparatus 100, according to aspects of the present disclosure. FIG. 1B shows a perspective view of the bicycle mount apparatus 100, according to aspects of the present disclosure. FIG. 1C shows an exploded view of the bicycle mount apparatus 100 coupled to a side 200 of a container, according to aspects of the present disclosure. FIG. 1D shows a perspective view of the bicycle mount apparatus 100 coupled to the side 200 of the container, according to aspects of the present disclosure.

As discussed above, the bicycle mount apparatus 100 generally includes a base plate 102 and a reinforcement plate 104. Fasteners 106 are used to couple the base plate 102 to the reinforcement plate 104. The base plate 102 includes at least one aperture 108 to accept a mounting pin 110 from the reinforcement plate 104. In some aspects, the base plate 102 can include two apertures, three apertures, four apertures, or more to secure the base plate 102 to the reinforcement plate 104. In some aspects, the base plate 102 can include rows 112 of apertures 108, such as two rows 112 (as shown in FIG. 1A), three rows, four rows, or more. The two rows 112 of apertures 108 allow the position of the reinforcement plate 104 relative to the base plate 102 to be changed to accommodate, for example, various containers, to provide for various reinforcement configurations of the base plate 102 relative to the reinforcement plate 104, etc.

The base plate 102 can formed of a rigid or substantially rigid material to secure the bicycle mount apparatus 100 to a container. By way of example, the base plate 102 can be formed a metal (e.g., steel, aluminum, titanium, etc.), a metal alloy (e.g., bronze, brass, etc.), or a hard plastic (e.g., acrylonitrile butadiene styrene (ABS), polystyrene (PS), polyvinyl chloride (PVC), etc.). The base plate 102 can also include one or more ridges 114 to provide additional reinforcement. As shown, the ridges can extend in different directions across the base plate 102 to provide for additional rigidity.

The dimensions of the base plate 102 can vary depending on, for example, the size of the container, the size of the bicycle frame being fixed to the container, etc. In some aspects, the base plate 102 can be about 4 inches in width and 9 inches in length. However, the dimensions of the base plate 102 can vary without departing from the spirit and scope of the present disclosure.

The reinforcement plate 104 provides reinforcement to the bicycle mount apparatus 100 on the opposite side of the container from the base plate 102. The reinforcement plate 104 also provides rigidity against twisting or torsion of the bicycle mount apparatus 100 relative to the container.

The reinforcement plate 104 can formed of a rigid or substantially rigid material, such as a metal (e.g., steel, aluminum, titanium, etc.), a metal alloy (e.g., bronze, brass etc.), or a hard plastic (e.g., ABS, PS, PVC, etc.). The reinforcement plate 104 can be formed of the same or a different material than the base plate 102. The reinforcement plate 104 can also include one or more ridges 126 to provide additional reinforcement/rigidity to the reinforcement plate 104 itself.

The dimensions of the reinforcement plate 104 can vary depending on, for example, the size of the container, the size of the bicycle being fixed to the container, etc. In some aspects, the reinforcement plate 104 can be substantially the same length as the base plate, such as about 9 inches.

The reinforcement plate 104 includes at least one mounting pin 110. However, the number of mounting pins 110 can vary depending on, for example, the size of the container, the size of the bicycle being fixed to the container, etc. In the illustrated embodiment, the reinforcement plate 104 includes two mounting pins 110. The mounting pins 110 are used to couple the base plate 102 to the reinforcement plate 104, in addition to coupling the base plate 102 and the reinforcement plate 104 to the side of the container between the base plate 102 and the reinforcement plate 104. By including two or more mounting pins 110 to couple the base plate 102 to the reinforcement plate 104, along with the unitary configuration of the reinforcement plate 104, the reinforcement plate 104 provides additional torsional rigidity to the combination of the container and the bicycle mount apparatus 100.

The mounting pins 110 can formed of the same material or a different material than the reinforcement plate 104. For example, the mounting pins 110 can be formed of any rigid or substantially rigid material, including a metal (e.g., steel, aluminum, titanium, etc.), a metal alloy (e.g., bronze, bronze, etc.), and a hard plastic (e.g., ABS, PS, PVC, etc.).

The mounting pins 110 extend up from the reinforcement plate 104 and are configured to extend through a side of the container and through a corresponding aperture 108 in the base plate 102. Accordingly, the mounting pins 110 are at least long enough to extend through the thickness of the side of the container and the thickness of the base plate 102, while leaving the additional length required to secure a fastener to the mounting pins 110. In some aspects, where the apertures 108 of the container through which the mounting pins 110 extend are reinforced, and such reinforcement increases the thickness of the side of the container, the lengths of the mounting pins 110 are likewise increased to account for the additional thickness. By way of example, the mounting pins 110 can be about 0.5 to about 6 inches long, such as about 2 inches. The diameter of the mounting pins 110 can also vary depending on, for example, the size of the container, the size of the bicycle frame being fixed to the container, etc. By way of example, the diameters of the mounting pins 110 can be about 0.25 to about 1 inch, such as about 0.5 inch.

The mounting pins 110 can have various configurations to couple the base plate 102 to the reinforcement plate 104. The mounting pins 110 can be threaded to accept a correspondingly threaded fastener. In the illustrated embodiment, the mounting pins 110 are all threads such that the mounting pins 110 are threaded their entire lengths. However, the mounting pins 110 can have non-threaded portions. Alternatively, the mounting pins 110 can be formed of an alternative fastening configuration, such as spikes that includes corresponding caps that are secured to the opposite ends away from the reinforcement plate 104 to secure the base plate 102.

In the illustrated embodiment, the mounting pins 110 can have blunt ends opposite from the reinforcement plate 104. Such blunts end can be used, for example, when apertures are pre-formed in the side of the container. Alternatively, the mounting pins 110 can have sharp and/or pointed ends to assist in piercing through the side of the container.

The mounting pins 110 can be permanently attached to and/or integral with the reinforcement plate 104. Alternatively, the mounting pins 110 can be detachable from the reinforcement plate 104. For example, the mounting pins 110 can be detached from the reinforcement plate 104 to allow different sizes, shapes, and/or configurations of mounting pins 110 to be used with the same reinforcement plate 104 and base plate 102.

The bicycle mount apparatus 100 includes the fasteners 106 that interface with the mounting pins 110 to couple the base plate 102 to the reinforcement plate 104. The fasteners 106 can be any type of mechanical fastener depending on the mounting pin 110 used, such as nuts, screws, O-rings, C-rings, etc. In some aspects, where nuts are used as the fasteners 106 to interface with and couple to corresponding all thread mounting pins 110, the nuts can be wing nuts, which allows the fasteners 106 to be tightened and loosened against the mounting pins 110 manually by a user and without the assistance of a tool, such as a wrench.

The base plate 102 includes a bicycle fork extension 116 that extends up from the base plate 102. The bicycle fork extension 116 can either be integral with the base plate 102, as shown in FIG. 1A, or can be a separate component that attaches to the base plate 102. Although shown as being closer to one side of the base plate 102, the bicycle fork extension 116 can be centered on the base plate 102, or closer to the opposite side of the base plate 102. In addition, the bicycle fork extension 116 is shown as being parallel to the length of the base plate 102. Alternatively, the bicycle fork extension 116 can be positioned orthogonal to the length of the base plate 102. The bicycle fork extension 116 can be between the two rows 112 of apertures 108, as shown, or both of the two rows 112 of apertures 108 can be on the same side of the bicycle fork extension 116.

Although the base plate 102 is shown as including only one bicycle fork extension 116, the base plate 102 can alternatively include more than one bicycle fork extension 116. For example, the base plate 102 can include a second bicycle fork extension 116 on the opposite side from the illustrated bicycle fork extension 116. Multiple bicycle fork extensions 116 allow for the base plate 102 to be able to couple to multiple bicycle forks, or multiple bicycle mount assemblies, as discussed below.

The bicycle fork extension 116 is configured to couple to a bicycle fork. In such a configuration, the bicycle fork extension 116 includes a bicycle fork mount portion 118. As shown in FIG. 1A, the bicycle fork mount portion 118 includes two sides 120 that extend up from the base plate 102. The two sides 120 include apertures 122. Optionally, between the two sides 120 is a tube 124. The bicycle fork mount portion 118 is slightly shorter in distance as an inside distance between tangs of a bicycle fork such that the tangs of a bicycle fork can fit on both sides of the bicycle fork mount portion 118.

Any type of mechanical fastener can be used to secure a bicycle fork to the bicycle fork extension 116. In some aspects, the apertures 122 and the tube 124 allow for a fastener, or a part of a fastener, such as a bolt, to extend therethrough for coupling the bicycle fork to the bicycle fork mount portion 118, as explained in greater detail below. With the bicycle fork mated with the bicycle fork mount portion 118, nuts can be secured to and tightened against opposite ends of the bolt. Alternatively, the sides 120 and/or the tube 124 can include threads that accept hex bolts, screws, or the like to be threaded thereto to secure the bicycle fork thereto.

Although the bicycle fork extension 116 can be configured to couple to a bicycle fork, in some configurations, the bicycle fork extension 116 can also be configured to couple to a bicycle fork assembly, as discussed in detail below. In some aspects, the bicycle fork extension 116 can instead be configured to connect only to a bicycle fork assembly and not to a bicycle fork.

Figure 2:
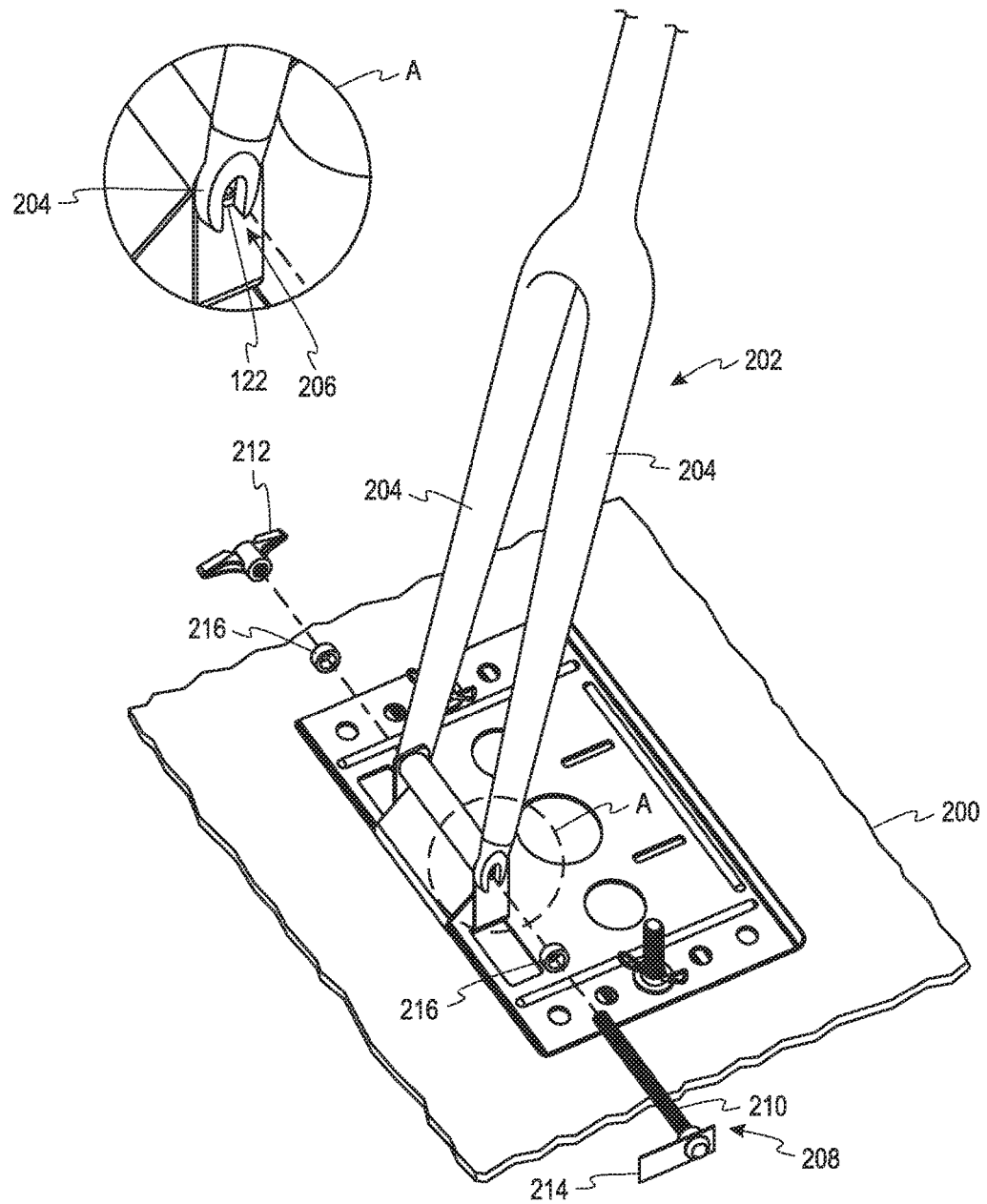
FIG. 2 shows a perspective view of the bicycle mount apparatus of FIG. 1A coupled to a container, with a bicycle fork coupled to the bicycle mount apparatus, according to aspects of the present disclosure.

Referring to FIG. 2, FIG. 2 shows a perspective view of the bicycle mount apparatus 100 coupled to the side 200 of a container, with a bicycle fork 202, such as a front bicycle fork, of a bicycle frame coupled to the bicycle mount apparatus 100, according to aspects of the present disclosure. The container can be any type of shipping container capable with shipping a bicycle. The container can be formed of, for example, corrugated cardboard, plastic, metal, etc. In some aspects, the container can have pre-made apertures through which the mounting pins 110 can extend through. Alternatively, the container can be formed of a material, such as a paper-based material, including corrugated cardboard, that can be pierced by the mounting pins 110 to create the apertures through which the mounting pins 110 extend.

As shown, the bicycle fork 202 includes two tangs 204. The inner distance between the tangs 204 is slightly larger than the distance between the sides 120 of the bicycle fork extension 116. The tangs 204 of the bicycle fork 202 abut against the bicycle fork extension 116. The ends of the tangs 204 include crescent-shaped recesses 206. The recesses 206 are generally for securing a wheel to the bicycle fork 202. However, in the case of securing the bicycle fork 202 to the bicycle mount apparatus 100, the recesses 206 line up with the apertures 122 in the sides 120 of the bicycle fork mount portion 118.

A bicycle fork fastener 208 secures the bicycle fork 202 to the bicycle fork extension 116. The bicycle fork fastener 208 includes a bolt 210, a wing nut 212, and a stop 214. The bolt 210 extends through the recesses 206 of the tangs 204 and the apertures 122 of the sides 120. On one side of the bicycle fork extension 116, the bicycle fork fastener 208 includes the stop 214 that abuts, for example, the base plate 102 to prevent or inhibit the bolt 210 from rotating while securing the bicycle fork 202. Alternatively, the stop 214 can abut the side 200 of the container. On the other side from the stop 214, the wing nut 212 is threaded onto the bolt and tightening of the wing nut 212 secures the tangs 204 to the bicycle fork extension 116. Optionally, the bicycle fork fastener 208 can include bushings 216 between the tangs 204 and the stop 214 and wing nut 212. The bushings 216 provide for a larger and/or uniform interface between the bicycle fork fastener 208 and the tangs 204 of the bicycle fork 202.

Although one particular type of fastener 208 is shown and described, other types of fasteners for securing the bicycle fork 202 to the bicycle mount apparatus can be used without departing from the spirit and scope of the present disclosure. Such other fasteners include, for example, clamps, screws, nails, etc.

With the bicycle fork 202 as shown in FIG. 2, with the bicycle mount apparatus 100 including the base plate 102 coupled to the reinforcement plate 104 on opposite sides of the side 200 of the container, the bicycle fork 202 and corresponding bicycle frame is secured to the container for shipping. The inclusion of the reinforcement plate 104 provides a more solid attachment point for the bicycle fork 202 to the container than a conventional mount that lacks the reinforcement plate 104.

Figure 3A:
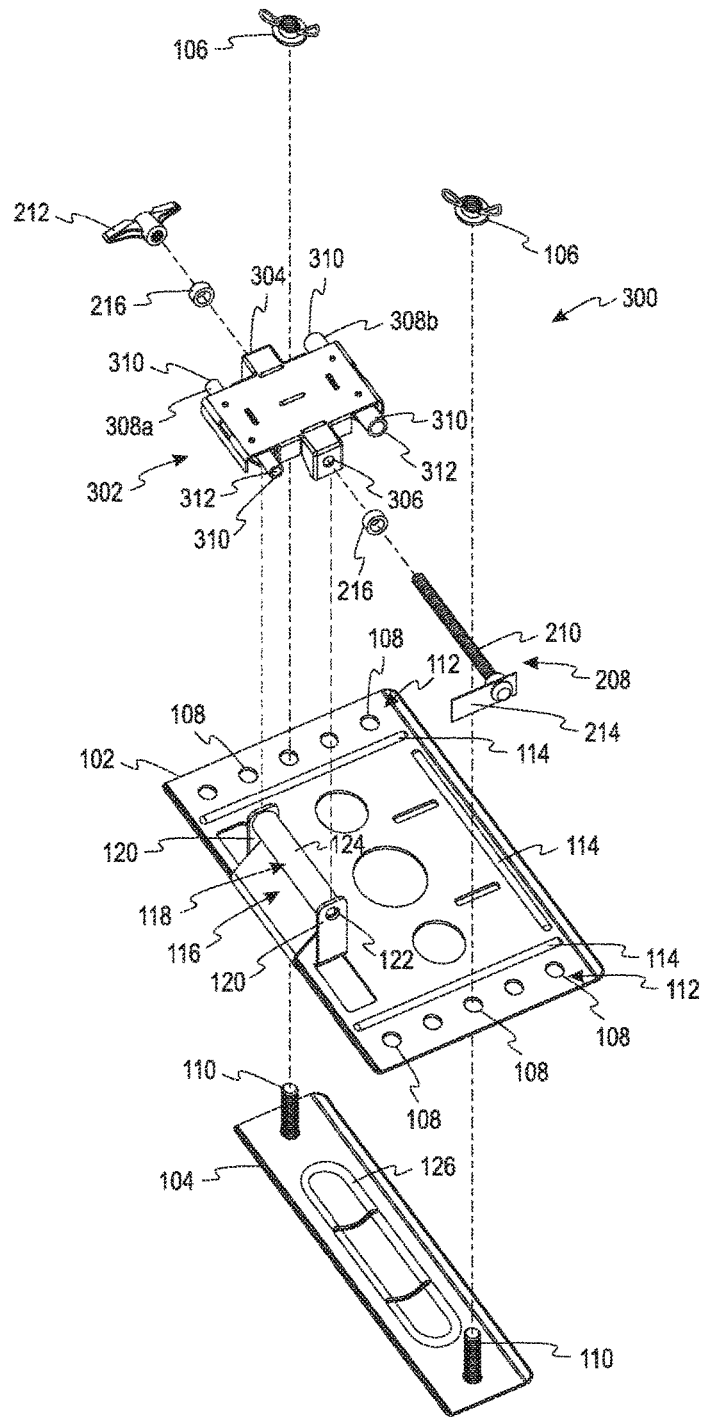
FIG. 3A shows an exploded view of a bicycle mount apparatus, including a bicycle fork assembly, according to aspects of the present disclosure.
Figure 3B:
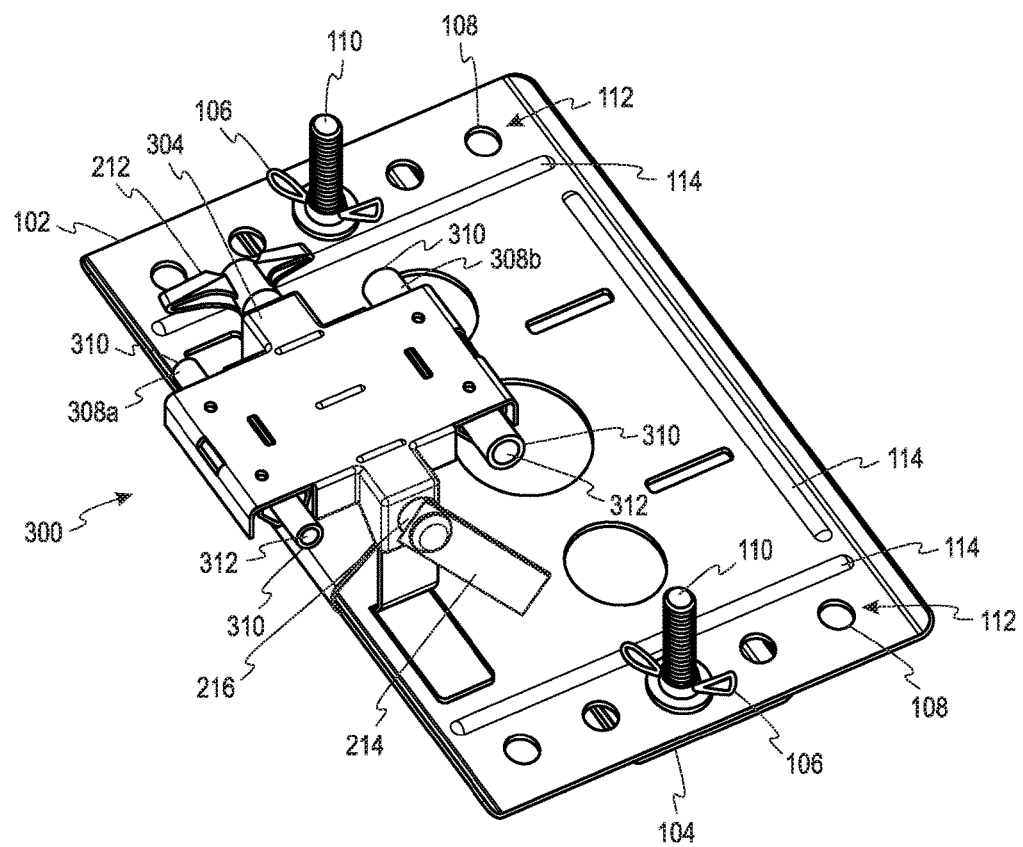
FIG. 3B shows a perspective view of the bicycle mount apparatus of FIG. 3A, according to aspects of the present disclosure.
Figure 3C:
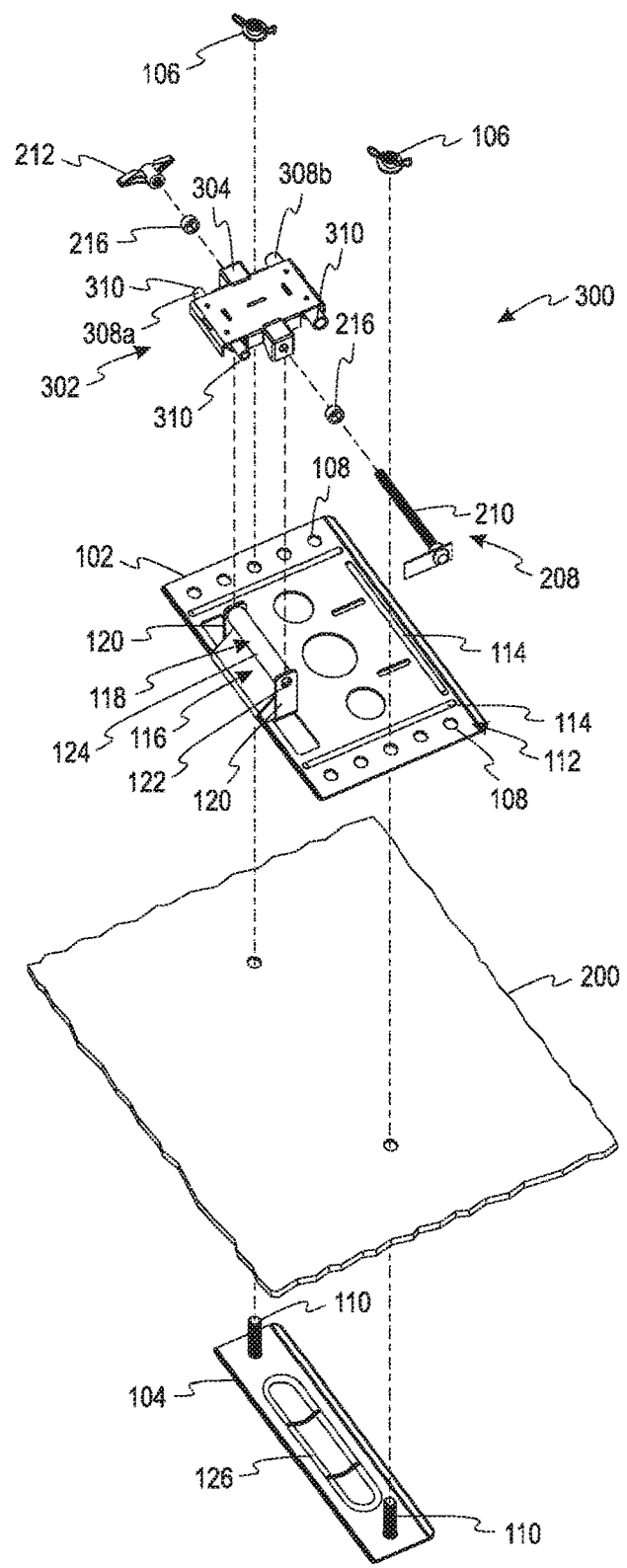
FIG. 3C shows an exploded view of the bicycle mount apparatus of FIG. 3A coupled to a side of a container, according to aspects of the present disclosure.
Figure 3D:
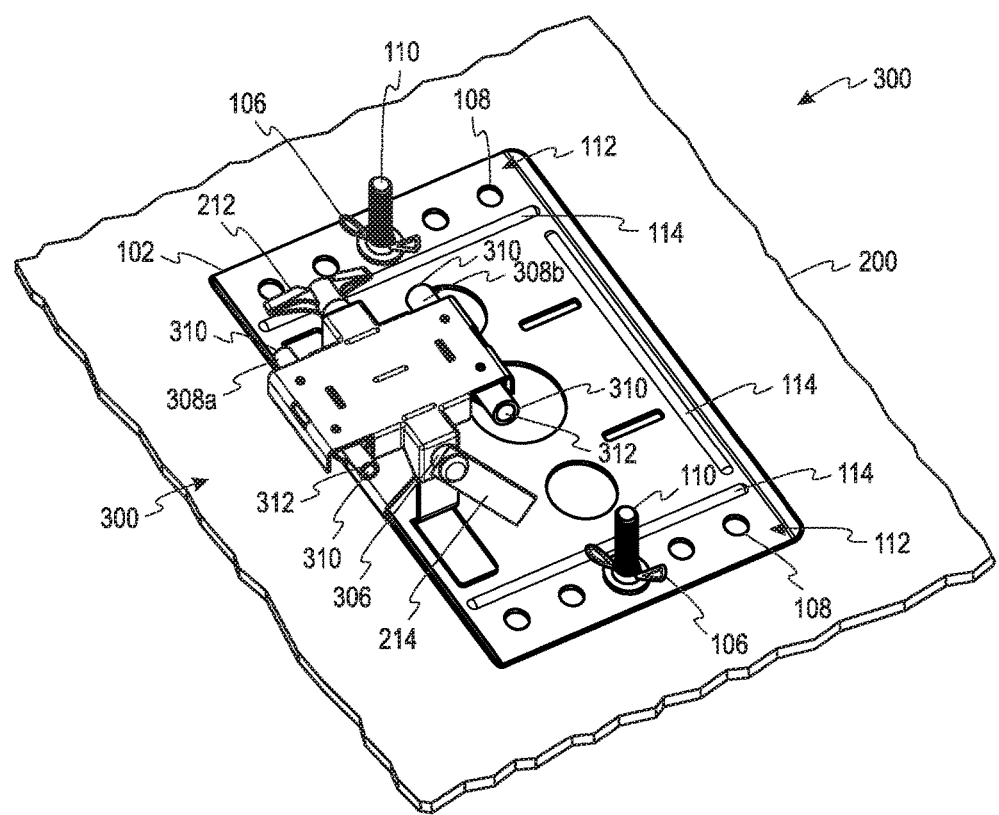
FIG. 3D shows a perspective view of the bicycle mount apparatus of FIG. 3A coupled to the side of the container, according to aspects of the present disclosure.

Referring to FIGS. 3A-3D, FIG. 3A shows an exploded view of a bicycle mount apparatus 300, including with a bicycle fork assembly 302, according to aspects of the present disclosure. FIG. 3B shows a perspective view of the bicycle mount apparatus 300 of FIG. 3A, according to aspects of the present disclosure. FIG. 3C shows an exploded view of the bicycle mount apparatus 300 coupled to a side 200 of a container, according to aspects of the present disclosure. FIG. 3D shows a perspective view of the bicycle mount apparatus 300 coupled to the side 200 of the container, according to aspects of the present disclosure.

The bicycle mount apparatus 300 is similar to the bicycle mount apparatus 100 described above. Therefore, similar features are similarly numbered. However, as compared to the bicycle mount apparatus 100, the bicycle mount apparatus 300 includes a bicycle fork assembly 302. The bicycle fork assembly 302 allows the bicycle mount apparatus 300 to accommodate various different styles of bicycle frames, such as bicycle frames with quick-release bicycle fork mechanisms for securing the front tire to the front bicycle fork of the bicycle frame. Thus, the bicycle mount apparatus 300 is similar to the bicycle mount apparatus 100, with the addition of the bicycle fork assembly 302.

The bicycle fork assembly 302 includes a bracket 304 that is configured to interface with the base plate 102 such that the bicycle fork assembly 302 can couple to the base plate 102. The bracket 304 can be configured to either couple directly to the base plate 102, or to the bicycle fork extension 116, as shown in FIGS. 3A-3D.

In aspects where the bicycle fork assembly 302 couples to the bicycle fork extension 116, the bracket 304 is configured to fit around and abut the ends of the sides 120 of the bicycle fork mount portion 118 of the bicycle fork extension 116. The bracket 304 also can include apertures 306.

A mechanical fastener is used to secure the bracket 304 to the bicycle fork extension 116. The mechanical fastener can be any type of mechanical hardware device, such as a nut and bolt, a latch, a rivet, a clip, a snap, etc. In some aspects, the bicycle fork fastener 208 described above can be used to secure the bracket 304 to the bicycle fork extension 116, as shown. The bolt 210 extends through the apertures 122 in the bicycle fork extension 116 and through the apertures 306 in the bracket 304.

The bicycle fork assembly 302 includes two bicycle fork adapters 308A and 308B. The bicycle fork adapters 308A and 308B are configured to accept the quick-release bicycle fork mechanism of a bicycle frame for securing front wheels to front bicycle frames instead of, for example, the fixed axle configurations described above with respect to the bicycle fork extension 116. Each bicycle fork adapter 308A and 308B includes two ends 310, and both of the ends 310 include apertures 312. The apertures 312 allow rods of quick-release bicycle fork mechanisms to extend through the bicycle fork adapters 308A and 308B.

The bicycle fork assembly 302, including both the bracket 304 and the bicycle fork adapters 308A and 308B, can be formed of the same material or a different material than the base plate 102 and the reinforcement plate 104 described above. For example, the bicycle fork assembly 302 can be formed of any rigid or substantially rigid material, including a metal (e.g., aluminum, titanium, etc.), a metal alloy (e.g., steel, bronze, bronze, etc.), and a hard plastic (e.g., ABS, PS, PVC, etc.). In some aspects, the bracket 304 of the bicycle fork assembly 302 can be formed of, for example, steel or aluminum, and the bicycle fork adapters 308A and 308B can be formed of a hard polymer, such as PVC.

Figure 3E:
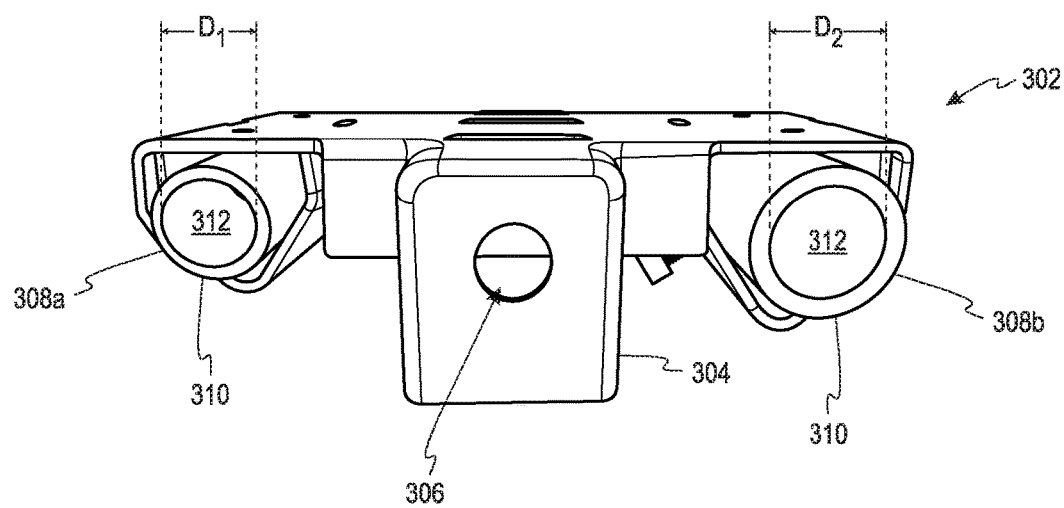
FIG. 3E shows an end view of the bicycle fork assembly of FIG. 3A, according to aspects of the present concepts.

Referring to FIG. 3E, FIG. 3E shows an end view of the bicycle fork assembly 302, according to aspects of the present concepts. To be configured to interface with and couple to various sizes of bicycle forks, the bicycle fork adapters 308A and 308B can have various different sizes. The bicycle fork adapter 308A can have an inner diameter D1 of, for example, about 0.75 to about 1 inch, and the bicycle fork mount 308B can have an inner diameter D2 of, for example, about 1 to about 1.25 inches in diameter. The different diameter sizes allow for different diameters of rods of quick-release bicycle fork mechanisms to fit therethrough, while still providing a tight and secure fit between the bicycle fork adapters 308A and 308B and the rods.

Figure 4:
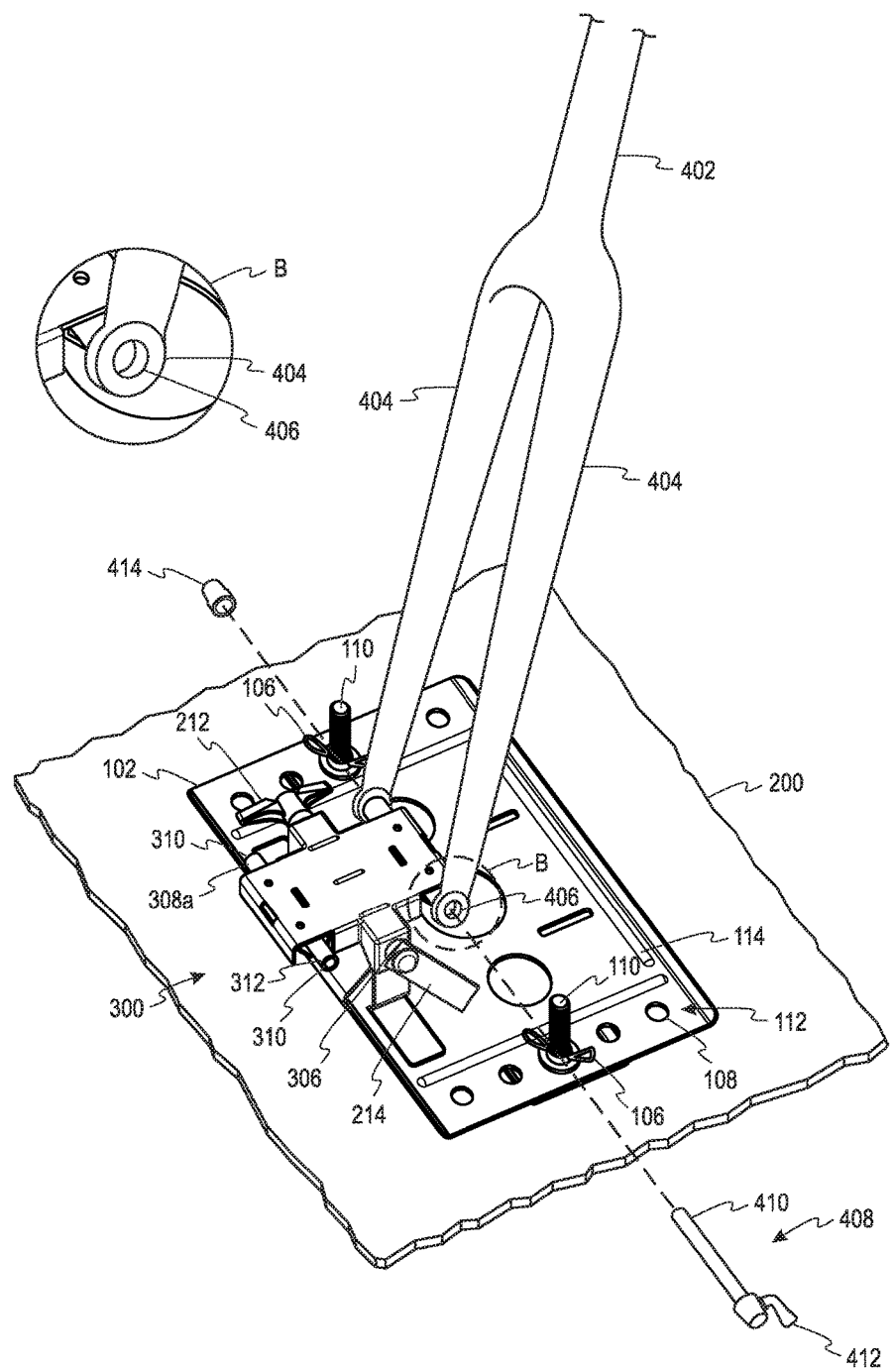
FIG. 4 shows a perspective view of the bicycle mount apparatus of FIG. 3A coupled to the side of a container, with a bicycle fork coupled to the bicycle mount apparatus, according to aspects of the present disclosure.

Referring to FIG. 4, FIG. 4 shows a perspective view of the bicycle mount apparatus 300 coupled to the side 200 of a container, with a bicycle fork 402 of a bicycle frame coupled to the bicycle mount apparatus 300, according to aspects of the present disclosure. As shown, the bicycle fork 402 includes two tangs 404. The tangs are compatible with a quick-release bicycle fork mechanism for attaching a wheel to the bicycle fork 402. Accordingly, the tangs 404 include apertures 406 rather than then crescent-shaped recesses 206 described above. The distance between the tangs 404 is slightly larger than the length of the bicycle fork adapters 308A and 308B. The tangs 404 of the bicycle fork 402 abut against the ends of the bicycle fork adapter 308A or 308B. The apertures 406 line up with the apertures 312.

A quick-release bicycle fork mechanism 408 used in securing a wheel to the bicycle fork 402 is used to secure the bicycle fork 402 to the bicycle fork adapter 308A. The rod 410 of the quick-release bicycle fork mechanism 408 extends through the apertures 406 and apertures 312 of the bicycle fork adapter 308A or 308B. A lever 412 of the quick-release bicycle fork mechanism 408 couples to the rod 410 and secures the bicycle fork 402 to the bicycle fork adapter 308A.

Figure 5:
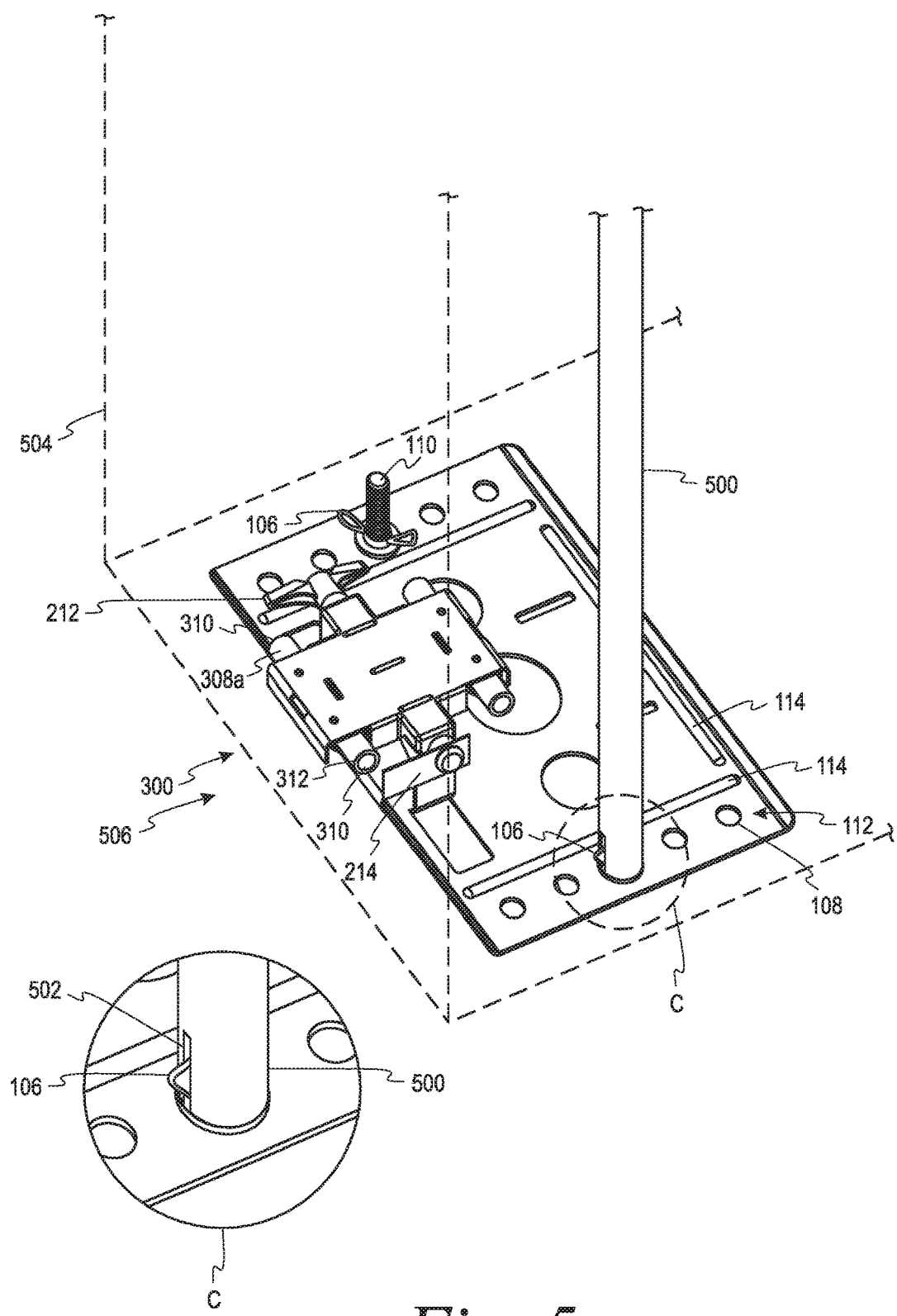
FIG. 5 shows a fastener extension for tightening and loosening fasteners of a bicycle mount apparatus, according to aspects of the present disclosure.

FIG. 5 shows a fastener extension 500 for tightening and loosening fasteners 106 of a bicycle mount apparatus (e.g., bicycle mount apparatus 100 and 300), according to aspects of the present disclosure. The fastener extension 500 can be used to tighten or loosen the fasteners 106 when the bicycle mount apparatus 100 or 300 is coupled to the side 200 of the container 506. The container 506 can be any type of container compatible with shipping a bicycle, such as any one of the containers described above with respect to FIG. 2. The vertical walls 504 of the container 506 may make it difficult to access the fasteners 106 within the container 506. Rather than a user having to extend his or her arm into the container 504 to access the fasteners, the user can instead use the fastener extension 500. The fastener extension 500 allows a user to access a fastener 106 secured to a mounting pin 110, with the base plate 102 and the reinforcement plate 104 secured to the side 200 of the container 506, without having to reach into the container 506 with the user's hands or arms.

In the aspects of the fasteners 106 being wing nuts, the fastener extension 500 can include slots 502 formed at the distal end of the fastener extension 500. As shown in the callout C of FIG. 5, the slots 502 are configured to accept the wings of the wing nut fasteners 106. The slots 502 accepting the wings allows a user to turn the fastener extension 500 and also the fastener secured within the fastener extension 500.

In some aspects, the fastener extension 500 can be configured differently to accommodate different styles and/or types of fasteners 106. For example, the fastener extension 500 can instead include a hexagonal aperture to accept correspondingly shaped hexagonal fasteners, such as nuts and bolts. In some aspects, the fastener extension 500 can be configured to accept multiple different styles and/or types of fasteners 106, such as including the hexagonal aperture in addition to the slots 106.

The present disclosure is susceptible to various modifications and alternative forms, and some representative embodiments have been shown by way of example in the drawings and will be described in detail herein. It should be understood, however, that the inventive aspects are not limited to the particular forms illustrated in the drawings. Rather, the disclosure is to cover all modifications, equivalents, combinations, and alternatives falling within the spirit and scope of the invention as defined by the appended claims.

What is claimed is:

1. A bicycle mount apparatus for securing at least one bicycle within a container, the bicycle mount apparatus comprising:
   a base plate comprising at least one aperture;
   a bicycle fork extension extending up from the base plate and configured to couple to at least one bicycle fork of the at least one bicycle;
   a reinforcement plate including at least one mounting pin, each mounting pin of the at least one mounting pin being configured to be inserted through a side of the container and one aperture of the at least one aperture; and
   at least one fastener, each fastener of the at least one fastener being configured to couple to one mounting pin of the at least one mounting pin to couple the base plate to the reinforcement plate,
   wherein the side of the container is located between the base plate and the reinforcement plate.

2. The bicycle mount apparatus of claim 1, wherein the bicycle fork extension comprises a pair of vertical sides, each side of the pair of vertical sides including an aperture therethrough forming a pair of aligned apertures.

3. The bicycle mount apparatus of claim 2, further comprising:
   at least one bicycle fastener configured to extend through the pair of aligned apertures and abut against ends of the at least one bicycle fork to couple the at least one bicycle fork to the bicycle fork extension.

4. The bicycle mount apparatus of claim 1, wherein the at least one aperture comprises a first row of apertures and a second row of apertures.

5. The bicycle mount apparatus of claim 4, wherein the first row of apertures and the second row of apertures are on opposite sides of the bicycle fork extension.

6. The bicycle mount apparatus of claim 4, wherein the at least one mounting pin comprises a first mounting pin and a second mounting pin, the first mounting pin and the second mounting pin being spaced apart such that the first mounting pin extends through an aperture of the first row of apertures and the second mounting pin extends through an aperture of the second row of apertures, with the base plate coupled to the reinforcement plate and the side of the container between the base plate and the reinforcement plate.

7. The bicycle mount apparatus of claim 1, further comprising:
   a fastener extension configured to extend into the container to couple and de-couple the at least one fastener to the at least one mounting pin, with the bicycle mount apparatus coupled to and inside of the container.

8. The bicycle mount apparatus of claim 7, wherein the at least one fastener is a wing nut and the fastener extension is a pole, the pole having one end with slots that accept wings of the wing nut.

9. A bicycle mount apparatus for securing at least one bicycle within a container, the bicycle mount apparatus comprising:
   a base plate comprising at least one aperture;

a reinforcement plate comprising at least one mounting pin, each mounting pin of the at least one mounting pin being configured to be inserted through a side of the container and one aperture of the at least one aperture, a side of the container being located between the base plate and the reinforcement plate; and a bicycle fork assembly configured to couple to the base plate, the bicycle fork assembly including a first bicycle fork adapter and a second bicycle fork adapter, each of the first bicycle fork adapter and the second bicycle fork adapter being configured to couple to at least one bicycle fork of the at least one bicycle via a quick-release bicycle fork mechanism.

10. The bicycle mount apparatus of claim 9, wherein each of the first bicycle fork adapter and the second bicycle fork adapter is sized to fit between the at least one bicycle fork.

11. The bicycle mount apparatus of claim 9, wherein each of the first bicycle fork adapter and the second bicycle fork adapter is a hollow tube configured to accept a rod of the quick-release bicycle fork mechanism therethrough.

12. The bicycle mount apparatus of claim 9, further comprising:
a bicycle fork extension extending up from the base plate and configured to couple to the at least one bicycle fork of the at least one bicycle,
wherein the bicycle fork assembly includes a bracket configured to couple to the bicycle fork extension to connect the bicycle fork assembly to the base plate, in place of the at least one bicycle fork.

13. The bicycle mount apparatus of claim 9, wherein a diameter of the first bicycle fork adapter is larger than a diameter of the second bicycle fork adapter.

14. The bicycle mount apparatus of claim 9, further comprising:
at least one fastener, each fastener of the at least one fastener being configured to interface with one mounting pin of the at least one mounting pin to couple the base plate to the reinforcement plate, with the side of the container sandwiched between the base plate and the reinforcement plate.

15. A bicycle mount apparatus for securing at least one bicycle within a container, the bicycle mount apparatus comprising:
a base plate comprising at least one aperture;
a reinforcement plate comprising at least one mounting pin, each mounting pin of the at least one mounting pin being configured to be inserted through a side of the container and one aperture of the at least one aperture, with the side of the container located between the base plate and the reinforcement plate;
a bicycle fork extension extending up from the base plate and configured to couple to at least one bicycle fork of the at least one bicycle; and
a bicycle fork assembly configured to couple to the bicycle fork extension, the bicycle fork assembly including a first bicycle fork adapter and a second bicycle fork adapter, each of the first bicycle fork adapter and the second bicycle fork adapter being configured to couple to at least one bicycle fork of the at least one bicycle.

16. The bicycle mount apparatus of claim 15, wherein the bicycle fork extension is configured to interface with crescent-shaped recesses of at least one bicycle fork of the at least one bicycle to couple the at least one bicycle fork to the bicycle fork extension, with the bicycle fork assembly detached from the bicycle fork extension.

17. The bicycle mount apparatus of claim 16, wherein the bicycle fork extension comprises a pair of apertures that accept a fastener therethrough to couple the at least one bicycle fork to the bicycle fork extension.

18. The bicycle mount apparatus of claim 15, further comprising:
a bicycle fork extension fastener configured to secure the bicycle fork assembly to the bicycle fork extension.

* * * * *